(12) United States Patent
Zhao et al.

(10) Patent No.: US 8,475,704 B2
(45) Date of Patent: Jul. 2, 2013

(54) FABRICATION OF PRINTHEAD NOZZLE PLATE COATING WITH SELF CLEANING AND HIGH DROOL PRESSURE BY ELECTROSPINNING TECHNIQUE

(75) Inventors: Hong Zhao, Webster, NY (US);
Kock-Yee Law, Penfield, NY (US);
Varun Sambhy, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 697 days.

(21) Appl. No.: 12/697,516

(22) Filed: Feb. 1, 2010

(65) Prior Publication Data

US 2011/0189918 A1  Aug. 4, 2011

(51) Int. Cl.
*B29C 41/20* (2006.01)
*B32B 15/14* (2006.01)
*D01D 5/34* (2006.01)
*D06M 10/00* (2006.01)

(52) U.S. Cl.
USPC ............... 264/465; 264/172.15; 264/259

(58) Field of Classification Search
USPC ............... 264/172.15, 259, 464, 465, 466, 264/484
See application file for complete search history.

(56) References Cited

U.S. PATENT DOCUMENTS

| | | | |
|---|---|---|---|
| 5,376,117 A * | 12/1994 | Pinchuk et al. | 623/8 |
| 2006/0094320 A1* | 5/2006 | Chen et al. | 442/340 |
| 2008/0242774 A1* | 10/2008 | Lahann et al. | 524/99 |
| 2009/0197048 A1* | 8/2009 | Amin et al. | 428/142 |
| 2010/0297906 A1* | 11/2010 | Steckl et al. | 264/466 X |

* cited by examiner

*Primary Examiner* — Leo B Tentoni
(74) *Attorney, Agent, or Firm* — MH2 Technology Law Group LLP (57) ABSTRACT

Exemplary embodiments provide materials and methods for ink jet printhead nozzle plate and related printing apparatus, wherein the ink jet printhead nozzle plate can include a coaxially electrospun layer to provide a low adhesion oleophobic textile surface exhibiting a low sliding angle and a high contact angle with ultra-violet gel ink and/or solid ink.

16 Claims, 6 Drawing Sheets

FABRICATION OF PRINTHEAD NOZZLE PLATE COATING WITH SELF CLEANING AND HIGH DROOL PRESSURE BY ELECTROSPINNING TECHNIQUE

DETAILED DESCRIPTION

1. Field of the Use

The present teachings relate generally to printer members in ink jet marking systems and, more particularly, to an ink jet printhead nozzle plate fabricated using electrospinning techniques.

2. Background

Conventional solid ink jet printers create an image on an image substrate by melting ink and delivering the melted ink to a printhead reservoir, where it is then transferred onto the image substrate through a face plate in the printhead. The image substrate includes a final print medium (e.g., paper) or an intermediate transfer member (e.g., an image drum). Solid ink images are therefore printed directly onto the paper or first printed on the image drum and then transfixed to the paper.

Various materials are used for the front face plate of ink jet printheads. For example, conventional materials include low surface energy hydrophobic coatings (e.g., TEFLON®) applied to a plate substrate of printheads to keep aqueous-based ink from weeping and leaking onto the front face, and to enable dewetting of aqueous-based ink. On the other hand, TEFLON® coatings have high affinity for solid ink and ultraviolet (UV) ink. In fact, wetting, drooling, and contamination of solid ink and ultra-violet (UV) ink are often observed on Maverick printheads. Active maintenance is then required.

There is thus a need to provide a printhead nozzle plate having a low adhesion oleophobic front face surface to prevent ink from weeping out of the nozzles and wetting or sticking to the front face.

SUMMARY

According to various embodiments, the present teachings include a method for making an ink jet printhead nozzle plate. In this method, a core polymer and a shell polymer can be coaxially electrospun into a coaxially electrospun layer on a plate substrate. The coaxially electrospun layer can have a low adhesion, oleophobic textile surface that exhibits a low sliding angle of from less than about 1° to less than about 30° with one or more of the jetted drops of ultra-violet gel ink and jetted drops of solid ink. Various embodiments can also include the formed ink jet printhead nozzle plate and related printhead using the formed ink jet printhead nozzle plate.

According to various embodiments, the present teachings also include an ink jet printhead nozzle plate that includes a coaxially electrospun layer disposed on a plate substrate. The coaxially electrospun layer can be formed of a coaxially electrospun fiber. The coaxially electrospun fiber can include a low adhesion, oleophobic shell polymer conformally disposed on an electrospun core polymer so as to provide the coaxially electrospun layer a low adhesion, oleophobic textile surface. Such surface can exhibit a low sliding angle of from less than about 1° to less than about 30° with at least one of the jetted drops of ultra-violet gel ink and jetted drops of solid ink.

It is to be understood that both the foregoing general description and the following detailed description are exemplary and explanatory only and are not restrictive of the present teachings, as claimed.

BRIEF DESCRIPTION OF THE DRAWINGS

The accompanying drawings, which are incorporated in and constitute a part of this specification, illustrate several embodiments of the present teachings and together with the description, serve to explain the principles of the present teachings.

It should be noted that some details of the FIGS. have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

Exemplary embodiments provide materials and methods for ink jet printhead nozzle plate and related printing apparatus. In one embodiment, a shell polymer, for example, a low adhesion polymer material, and a core polymer, for example, an electrospinnable polymer, can be coaxially electrospun into a coaxially electrospun layer, such as a non-woven textile layer (e.g., a mat), providing a low adhesion oleophobic textile surface. The coaxially electrospun layer can be formed on a substrate, for example, a printhead nozzle plate substrate for ink jet printhead applications.

The coaxially electrospun layer can have low (e.g., or no) adhesion with, for example, ultra-violet (UV) curable phase change ink and/or solid ink (also referred to as phase change ink). In embodiments, the coaxially electrospun textile layer can have an oleophobic textile surface and can be ultra-/super-hydrophobic, oleophobic, and ultra-/super-oleophobic.

The coaxially electrospun textile layer can be disposed or formed on an ink jet printhead plate substrate to resist contamination, drooling, and/or flooding by jetted drops of UV ink and jetted drops of solid ink such that the ink jet printhead nozzle plate can be self cleaned or maintenance free. Printing cost can then be reduced and reliability of the print engine can be improved.

As used herein, the terms "oleophobicity" and "oleophobic surface" refers to wettability of a surface that has an oil contact angle of approximately about 55° or greater, for example, with UV gel ink, solid ink, hexadecane, dodecane, hydrocarbons, etc. In embodiments, on an oleophobic surface, a ~10-15 μL drop can bead up and have an equilibrium contact angle of approximately 55° or greater. In embodiments, the oil contact angle of an oleophobic textile surface can range from about 55° to about 120°, or from about 70° to about 120°, or greater than about 120°.

In embodiments, jetted drops of UV gel ink or jetted drops of solid ink can thus exhibit very little adhesion towards the oleophobic textile surface of the disclosed coaxially electrospun layer. The "adhesion" can be measured by the sliding angle of the ink drop, the lower the sliding angle, the lower the adhesion between the ink drop and the coaxially electrospun layer.

In embodiments, the term "low adhesion" means a low sliding angle, wherein the low sliding angle can range from less than about 1° to less than about 30°, or from less than about 25° to less than about 30°, or from about 1° to less than about 20°, or from about 1° to less than about 15°, when measured with ultra-violet curable gel ink or solid ink, with the coaxially electrospun layer over the printhead front face surface.

In embodiments, the disclosed coaxially electrospun layer can exhibit very "low adhesion" with UV ink and solid ink as measured by a low sliding angle so that ink drops on the printhead front face roll off and leave no residue. In embodiments, ink jet printhead nozzle plate having the coaxially electrospun layer as a front face can enable production of high quality, high throughput, digitally printed images with ultra-violet gel ink or solid ink that is ejected from a printhead. The formed images can be substantially free of print defects due to misdirected droplets or missing jets caused by front face drooling of the ink experienced with conventional printhead front faces.

In embodiments, jetted drops of ultra-violet gel ink or jetted drops of solid ink can exhibit a contact angle with the oleophobic textile surface of from greater than about 55° to greater than about 70°, or from greater than about 80° to greater than about 100° or to greater than about 120°. When ink is filled into the printhead, it is desired to maintain the ink within the printhead nozzle until it is time to eject the ink. Generally, the greater the ink contact angle, the better (or higher) the holding (or drooling) pressure. The great contact angle of the above coaxially electrospun layer of the printhead nozzle plate can improve de-wetting and jetted ink drop quality as well as eliminate weeping.

As disclosed herein, the term "holding pressure" measures the ability of an aperture nozzle plate to avoid ink weeping out of the nozzle opening when the pressure of the ink tank (reservoir) increases. Advantageously, the disclosed coaxially electrospun layer provided in combination with low adhesion and high contact angle with UV curable gel ink and solid ink can further provide an improved holding pressure and/or reduced/eliminated weeping of ink out of the nozzle.

Figure 1A:
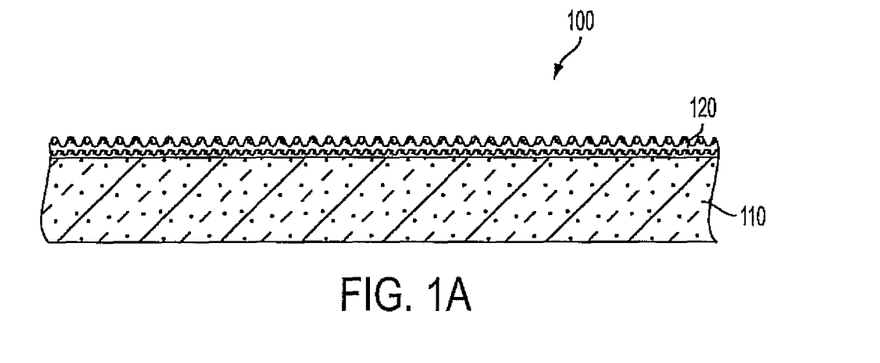
FIG. 1A depicts an exemplary ink jet printhead nozzle plate in accordance with various embodiments of the present teachings.

FIG. 1A depicts an exemplary printhead nozzle plate 100 in accordance with various embodiments of the present teachings. As shown the printhead nozzle plate 100 can include a coaxially electrospun layer 120 disposed over a substrate 110. It should be readily apparent to one of ordinary skill in the art that the nozzle plate 100 depicted in FIG. 1 represents a generalized schematic illustration and that other components/layers can be added or existing components/layers can be removed or modified.

In various embodiments, the substrate 110 can be in a form of a plate, a sheet, a film, a bar, or other suitable forms. In embodiments, the substrate 110 can be a metal substrate, such as, for example, steel and aluminum, or can be a plastic substrate, such as, for example, polyimide, polyphenylene sulfide, polyamide imide, polyketone, polyphthalamide, polyetheretherketone (PEEK), polyethersulfone, polyetherimide, and polyaryletherketone. In a specific embodiment, the substrate 110 can include a conventional ink jet printhead nozzle plate.

Figure 1B:
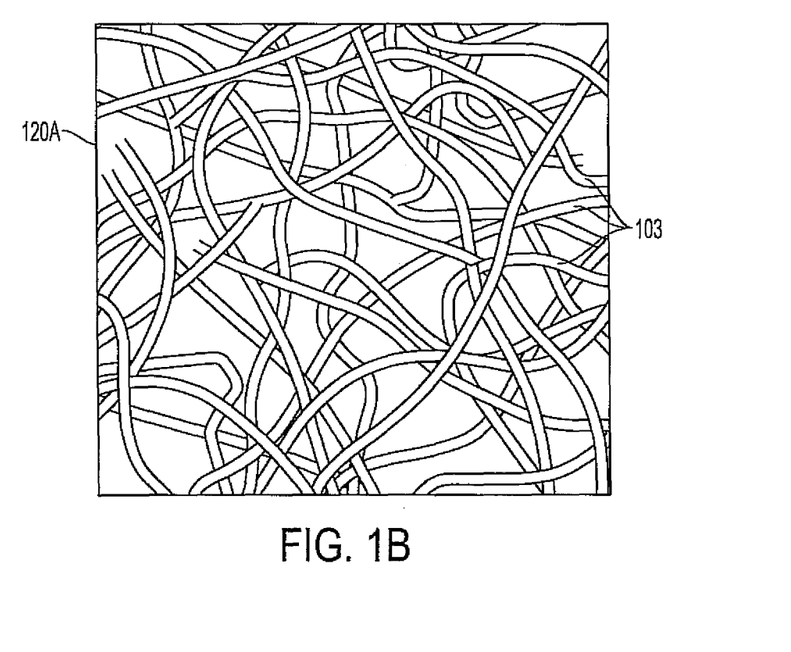
FIGS. 1B-1C depict exemplary surface structures of the coaxially electrospun layer of FIG. 1A in accordance with various embodiments of the present teachings.
Figure 1C:
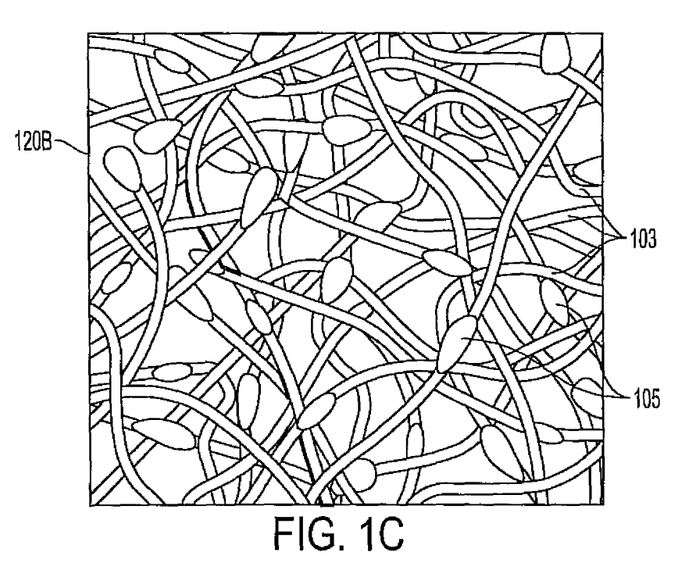

In embodiments, the coaxially electrospun layer 120 having the oleophobic textile surface can include a surface structure of, such as, for example, a fiber 103 on fiber 103 (fiber-on-fiber) structure 120A shown in FIG. 1B, and/or a bead 105 on fiber 103 (bead-on-fiber) structure 120B shown in FIG. 1C.

In various embodiments, the coaxially electrospun fiber 103 can have one or more beads 105, for example, disposed on the electrospun fiber surface and/or completely or partially embedded in the electrospun fibers, wherein the beads can have an average size ranging from about 50 nm to about 10 μm, or ranging from about 500 nm to about 8 μm, or ranging from about 100 nm to about 5 μm. In embodiments, such coaxially electrospun fibers incorporated with the one or more beads can form the bead-on-fiber structure 120B.

In embodiments, the coaxially electrospun layer 120 can also be porous having a porosity ranging from about 10% to about 99%, and in some cases ranging from about 50% to about 95%, or ranging from about 60% to about 80%. In embodiments, the pores of the coaxially electrospun layer 120 can have an average size in a range of from about 50 nm to about 50 μm, and in some cases, in a range of from about 100 nm to about 10 μm or in a range of from about 500 nm to about 5 μm. In various embodiments, the coaxially electrospun layer 120 can be thin and can have a thickness ranging from about 50 nm to about 3 μm, and in some embodiments, ranging from about 100 nm to about 3 μm, or ranging from about 500 nm to about 2 μm.

In embodiments, the coaxially electrospun layer 120 having the low adhesion, oleophobic textile surface can be hydrophobic, ultra-hydrophobic or super-hydrophobic, for example, having a water contact angle of at least about 120°, or at least about 150°, or at least about 170°.

While not intending to be bound by any specific theory, it is believed that the oleophobicity and/or hydrophobicity of the coaxially electrospun layer 120 can be controlled by the structure of, for example, the fiber-on-fiber structure 120A, and/or the bead-on-fiber structure 120B; and the sliding angle, or the contact angle can be further fine tuned by, for example, adjusting the porosity, the size of pores, electrospun fiber diameter, etc.

In embodiments, the coaxially electrospun layer 120 can be a mat-like material woven/non-woven from coaxially electrospun fibers 103 to form surface structures as shown in FIGS. 1B-1C. In embodiments, the coaxially electrospun fiber 103 can include a core-shell structure as shown in FIG. 1D in accordance with various embodiments of the present teachings.

Figure 1D:
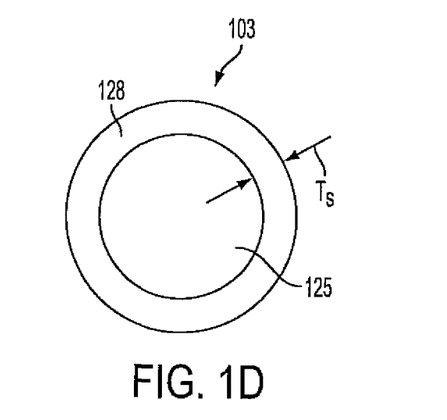
FIG. 1D depicts an exemplary coaxially electrospun fiber in accordance with various embodiments of the present teachings.

In FIG. 1D, the coaxially electrospun core-shell fiber 103 can include an electrospun core element, for example, a fiber core 125 surrounded by a shell layer 128 (or a sheath layer). Note that although FIG. 1D schematically illustrates a circular cross section for the electrospun fiber core 125, one of ordinary skill in the art would understand that the core element of the coaxially electrospun fiber 103 can have various other cross sectional shapes, regular or irregular, such as, for example, a rectangular, a polygonal, or an oval shape. Accordingly, the resulting core-shell electrospun fiber 103 can have, for example, cylindrical 3-dimensional shapes.

In various embodiments, the coaxially electrospun fiber 103 can have an outer diameter in a range of from about 50 nm to about 10 μm, and in some cases, in a range of from about 100 nm to about 4 μm, or in a range of from about 500 nm to about 2 μm. In embodiments, the shell layer 128 can have a shell thickness $T_s$ on the outer surface of the electrospun fiber core 125. In various embodiments, the shell thickness $T_s$ can be in a range from about 1 nm to about 1 μm, or in some cases, from about 10 nm to about 0.5 μm, or from about 50 nm to about 200 nm.

In embodiments, the coaxially electrospun fiber 103 of FIGS. 1B-1D can be made using a coaxial electrospinning technique to produce continuous, micron/nanometer diameter fibers, which can then be spun into a non-woven textile. In embodiments, the bead 105 of FIG. 1C can also have a core-shell cross sectional structure formed as similarly to the core-shell structure of the coaxially electrospun fiber 103 of FIG. 1D.

In embodiments, the disclosed coaxially electrospun layer 120 can be formed to have an improved mechanical strength characterized by, for example, ultimate tensile strength ranging from about 0.01 MPa to about 100 MPa, or ranging from about 0.1 MPa to about 50 MPa, or ranging from about 0.1 MPa to about 10 MPa.

Figure 2:
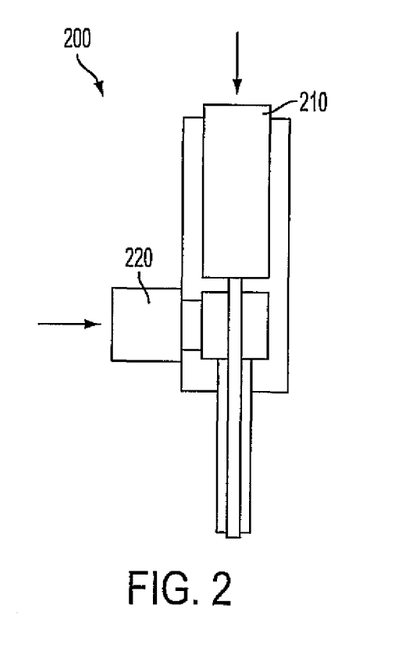
FIG. 2 depicts an exemplary device for forming a coaxially electrospun fiber or layer in accordance with various embodiments of the present teachings.

FIG. 2 depicts an exemplary electrospinning nozzle for forming the coaxially electrospun fiber 103 along with the coaxially electrospun layer 120 in accordance with various embodiments of the present teachings.

By using the coaxially electrospinning techniques as shown in FIG. 2, ultra/super hydrophobic or oleophobic textile surface can be prepared in one step as disclosed, which is different from convention electrospinning techniques. Convention electrospinning techniques require a 2-step process to prepare a coating including (1) preparing a mechanically strong textile mat by electrospinning (but not a coaxially electrospinning) and (2) modifying the mat surface to provide desirable surface properties.

In FIG. 2, the exemplary coaxially-electrospinning nozzle 200 can include a central tube 210 surrounded by a concentric annular tube 220. The central tube 210 can allow a core dispersion to be electrospun into a core element (see the exemplary fiber core 125 of FIG. 1D) of the fiber 103. The concentric annular tube 220 surrounding the central tube 210 can provide a side path allowing a shell dispersion (also referred to herein as a sheath dispersion) to be conformally shelled or coated onto the electrospun core element in the center. In an exemplary embodiment, the electrospinning process can be performed by pulling the jetted dispersion by an electric field that is further whipped and stretched by the bending instability. A solvent evaporation process can then be followed leading to the formation of solid-state fibers and/or a non-woven mat layer.

In embodiments, the core dispersion can include an electrospinnable, mechanically strong core polymer and the shell dispersion can include a shell polymer including, for example, a low adhesion, oleophobic material, coated onto the electrospun core polymer to form core-shell-structured nano/micro-fibers.

In embodiments, the core dispersion can have a suitable dielectric constant to provide sufficient charging for the electrospinning process. For example, polymer dispersions in water and formic acid can be electrospinnable, while polymer solutions in n-butyl acetate or methyl ethyl ketone can not be electrospinnable.

In embodiments, the core polymer can include, but is not limited to, Nylon, polycaprolactone (PCL), polystyrene, polymethyl-methacrylate (PMMA), poly(vinyl alcohol), poly(ethylene oxide), polyacrylonitrile, polylactide, poly(ether imide), polyurethane, poly(ether urethane), poly(ester urethane), aliphatic polyamide, aromatic polyamide, poly(p-phenylene terephthalate), poly(vinyl acetate), poly(acrylic acid), polyacrylamide, polyvinylpyrrolidone, poly(vinyl butyral), poly(alkyl acrylate), poly(alkyl methacrylate), polycarbonate, polyhydroxybutyrate, polyimide, poly(vinylidene fluoride), poly(vinylidene fluoride-co-hexafluoropropylene), fluorinated ethylene-propylene copolymer, poly(tetrafluoroethylene-co-perfluoropropyl vinyl ether), Teflon® PFA (i.e., perfluoroalkoxy), poly((perfluoroalkyl)ethyl methacrylate) and a mixture thereof.

In embodiments, while electrospinning the core polymer, the shell polymer can be essentially "shelled" or coated conformally onto the electrospun core polymer via the exemplary coaxial nozzle 200 as shown in FIG. 2.

In various embodiments, the shell polymer or the shell layer 128 (see FIG. 1D) can be a cross-linked coaxially electrospun coating created using one or more of heat, UV radiation, electron-beam, and a chemical reagent.

In various embodiments, the shell polymer or the shell layer 128 can include, for example, Component A, B, C and/or D. In embodiments, Component A of the low adhesion, oleophobic shell layer can include any suitable polymer or oligomer containing hydroxyl (—OH) functional groups. For example, Component A can be selected from the group consisting of hydroxyl functional polymers or oligomers such as polyvinyls, polystyrenes, polyacrylates, polyesters, polyethers, and mixtures thereof. In a specific embodiment, Component A can be a hydroxyl functional polyacrylate resin sold under the name Desmophen® A 870 BA available from Bayer Materials Science.

Component B of the low adhesion oleophobic shell layer can include any suitable polymer or oligomer containing isocyanate (—NCO) functional groups. For example, Component B can be selected from the group consisting of isocyanate functional polymers or oligomers such as polyvinyls, polystyrenes, polyesters, polyacrylates, and mixtures thereof. In embodiments, the isocyanate can be selected from the group consisting of diphenylmethane diisocyanate, toluene diisocyanate, hexamethylene diisocyanate, isophorone diisocyanate, or suitable polymer or oligomer containing isocyanate (—NCO) functional groups, and mixtures thereof. In a specific embodiment, Component B can be a solvent free aliphatic isocyanate resin based on hexamethylene diisocyanate sold under the name Desmodur® N 3300 A available from Bayer Materials Science.

Component C of the low adhesion oleophobic shell layer can be any suitable hydroxyl functionalized polymer or oligomer containing polysiloxane units. For example, Component C can be selected from the group consisting of hydroxyl functionalized polymers or oligomers containing polysiloxane units such as polyvinyls, polystyrenes, polyacrylates, polyethers, and mixtures thereof. In a specific embodiment, Component C can be a polymer including polysiloxane sidechains on hydroxyl-functional polyacrylate backbone sold under the name BYK-Silclean® 3700 available from BYK Additives and Instruments.

Component D of the low adhesion oleophobic shell layer can be any suitable fluoro-crosslinking materials. In embodiments, the fluoro-crosslinking material can be a hydroxyl functionalized polymer modifier sold under the name Fluorolink®, for example, Fluorolink-D®, Fluorolink-D10H®, or Fluorolink-E10H®, available from Solvay Solexis.

In one embodiment, the shell polymer or the shell layer 128 can include a low adhesion, oleophobic material including Components A, B, and C, wherein Component A can be a hydroxyl functionalized polyester, such as Desmophen® (available from Bayer Materials Science); Component B can be an isocyanate, such as Desmodur® or Bayhydur® (available from Bayer Materials Science); and Component C can be a hydroxyl functionalized polysiloxane crosslinking material, such as BYK-Silclean® (available from BYK Additives and Instruments).

In another embodiment, the shell polymer or the shell layer 128 can include a low adhesion, oleophobic material including Components A, B, and D, wherein Component A can be a hydroxyl functionalized polyester, such as Desmophen® (available from Bayer Materials Science); Component B can be an isocyanate, such as Desmodur® or Bayhydur® (available from Bayer Materials Science); and Component D can be a fluoro-crosslinking material Fluorolink® (available from Solvay Solexis).

In yet another embodiment, the shell polymer or the shell layer 128 can include a low adhesion, oleophobic material including Components A, B, C and D, wherein Component A can be a hydroxyl functionalized polyester, such as Desmophen® (available from Bayer Materials Science); Component B can be an isocyanate, such as Desmodur® or Bayhydur® (available from Bayer Materials Science); Component C can be a hydroxyl functionalized polysiloxane crosslinking material, such as BYK-Silclean® (available from BYK Additives and Instruments) and Component D can be a fluoro-crosslinking material Fluorolink® (available from Solvay Solexis).

In exemplary embodiments, the shell polymer or the shell layer 128 can be made by, for example, cross-linking a diisocyanate with a hydroxyl-functionalized polyester in a solvent in the presence of a hydroxyl functionalized polysiloxane crosslinking material. Alternatively, a fluoro-crosslinking material can be used. In certain embodiments, a mixture of a hydroxyl functionalized polysiloxane crosslinking material and a fluoro-crosslinking material can be used with the diisocyanate and the hydroxyl-functionalized polyester to form the shell polymer.

In embodiments, the shell polymer or the shell layer 128 can include a suitable polymer or oligomer containing one or more of, for example, an isocyanate functional group; a suitable polymer or oligomer containing a hydroxyl functional group; a suitable hydroxyl functionalized polymer or oligomer containing at least one polysiloxane unit; a hydroxyl functionalized fluoro-crosslinking material and/or a mixture of an oligomer containing at least one polysiloxane unit and a hydroxyl functionalized fluoro-crosslinking material.

In some embodiments, the shell layer 128 for ink jet printhead can include an isocyanate, a polylol; and a hydroxyl functionalized polysiloxane. In other embodiments, the shell layer 128 for ink jet printhead can include an isocyanate, a polylol; and a hydroxyl functionalized fluoro-crosslinking material. In yet other embodiments, the shell layer 128 for ink jet printhead can include an isocyanate, a polylol; a hydroxyl functionalized polysiloxane and a hydroxyl functionalized fluoro-crosslinking material.

In embodiments, the components of the low adhesion, oleophobic shell layer can be present in any suitable amount. For example, Component A can be present in an amount of from about 40 to about 80, or from about 50 to about 75, or from about 55 to 70 weight percent based upon the total weight of the low adhesion, oleophobic shell layer, although not limited.

Component B can be present in an amount of from about 15 to about 50, or from about 20 to about 45, or from about 25 to about 40 weight percent based upon the total weight of the low adhesion, oleophobic shell layer, although not limited.

Component C can be present in an amount of from about 0.1 to about 15, or from about 1 to about 10 weight percent, or from about 2 to about 8 weight percent based upon the total weight of the low adhesion, oleophobic shell layer, although not limited.

Component D can be present in an amount of from about 0.01 to about 5, or from about 0.1 to about 3, or from about 1 to about 2 weight percent based upon the total weight of the low adhesion, oleophobic shell layer, although not limited.

In embodiments, a mixture of Component C and Component D can be used for optimizing the desirable oleophobicity and reducing surface adhesion to UV gel ink and/or solid ink. In this case, Component C can be present in an amount of from about 0.1 to about 10, or from about 1 to about 8, or form about 2 to about 6 weight percent based upon the total weight of the low adhesion shell layer, although not limited. Component D can be present in an amount of from about 0.01 to about 5, or from about 0.1 to about 4, or from about 1 to about 2 weight percent based upon the total weight of the low adhesion, oleophobic shell layer, although not limited.

Figure 3:
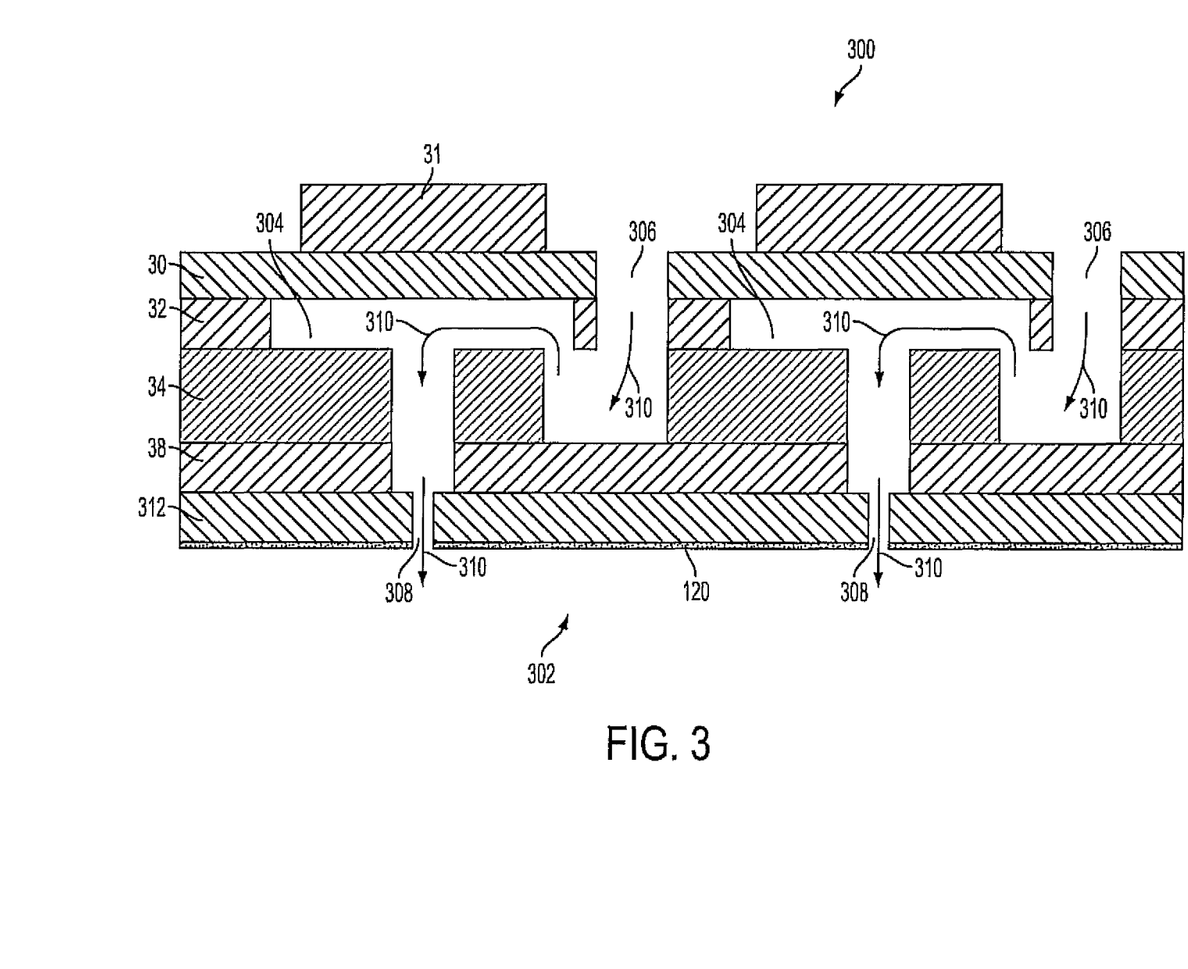
FIG. 3 depicts an exemplary printhead in accordance with various embodiments of the present teachings.
Figure 4:
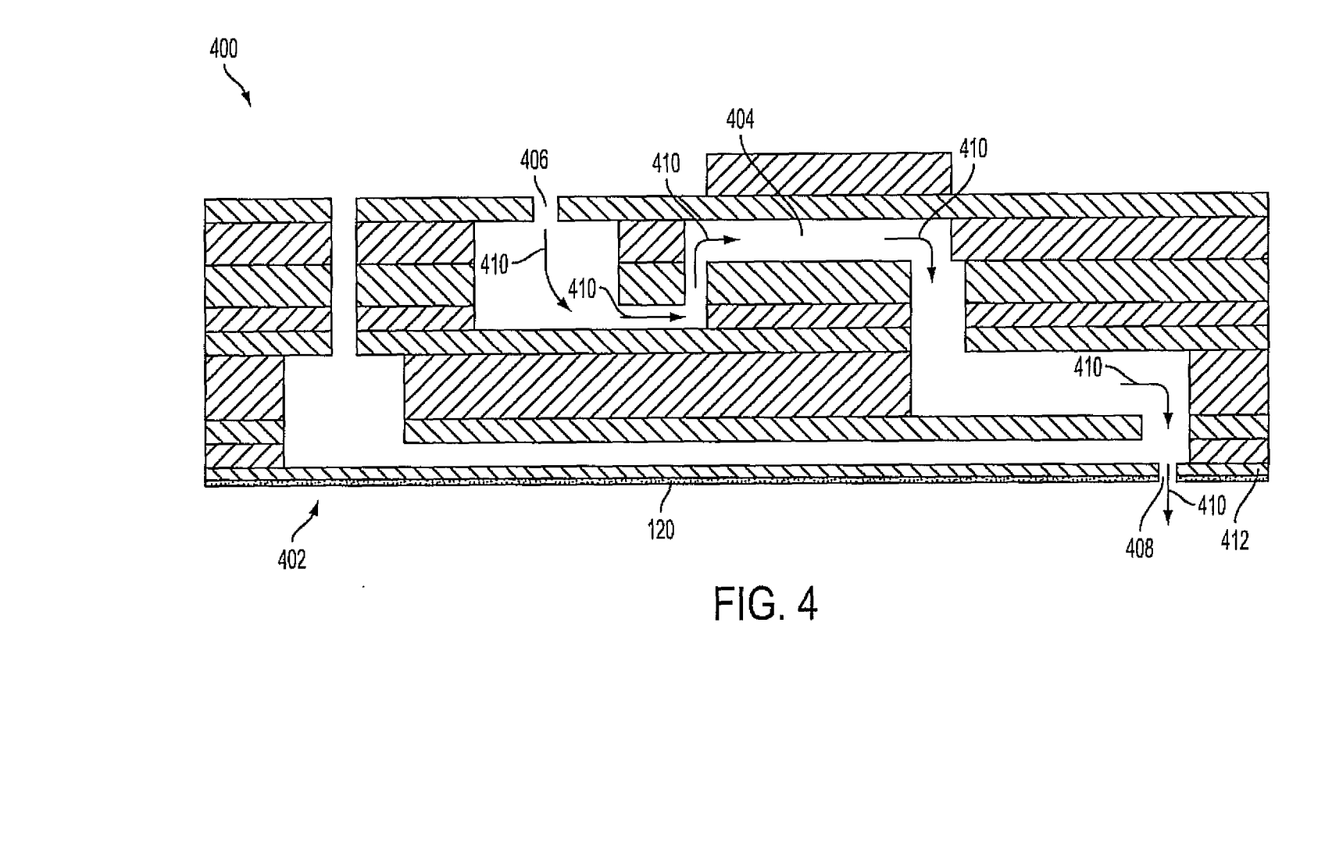
FIG. 4 depicts another exemplary printhead in accordance with various embodiments of the present teachings.
Figure 5:
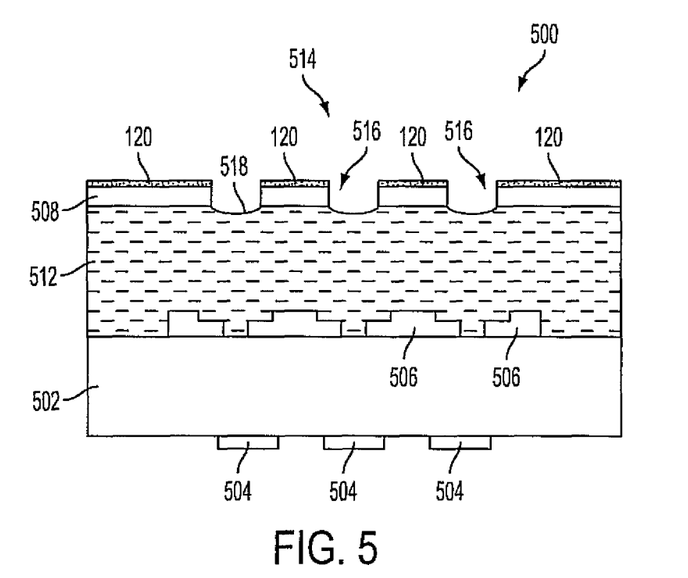
FIG. 5 depicts an additional exemplary printhead in accordance with various embodiments of the present teachings.

The coaxially electrospun layer 120 of FIGS. 1-2 can be used in ink jet printhead nozzle plate applications to provide desired low adhesion oleophobic front face surface. FIGS. 3-5 depict various exemplary printheads 300, 400 and 500 in accordance with various embodiments of the present teachings. For example, the coaxially electrospun layer 120 can be disposed along the printhead nozzle plate 312, 412, 508 of FIGS. 3-5, and can provide the printhead front face with sliding angle characteristics, low adhesion, and oleophobic surface to prevent ink from accumulating near the nozzles and interfering with the jetting of the ink droplets. In specific embodiments, satellite droplets of UV gel ink and solid ink landing on the nozzle plate 312, 412, 508 can exhibit a low sliding angle of, for example, from less than about 25° to less than about 30°, or from less than about 1° to less than about 20°, or from less than 1° to less than about 15°, with the printhead front face surface having the coaxially electrospun layer 120.

In FIG. 3, an exemplary drop on demand ink jet printhead 300 can include a body 302. The body 302 can be formed of multiple laminated plates or sheets, such as of stainless steel and/or polyimide. These sheets can be stacked in a superimposed relationship. As illustrated in FIG. 3, these sheets or plates of the body 302 can include a diaphragm plate 30 with a transducer 31 (e.g., a PZT device) on one surface, an ink pressure chamber plate 32, an inlet/outlet plate 34, an aperture brace plate 38 and an aperture plate 312, which is also referred to as an orifice plate or printhead front face plate.

In embodiments, the body 302 can include one or more ink pressure chambers 304 coupled to or in communication with one or more ink sources 306, and one or more ink ejection means, for example, orifices or nozzle/outlets 308. A typical ink jet printer can include a plurality of ink pressure chambers 304 with each pressure chamber 304 coupled to one or more nozzle/outlets 308. For simplification, two exemplary outlets 308 are illustrated in FIG. 3, although the printhead 300 can include more or less than two outlets. Each nozzle/outlet 308 can be coupled to or in communication with an ink pressure chamber 304 by way of an ink passage indicated by arrows 310. Ink can pass through nozzle/outlet 308 during ink drop formation. Ink drops can travel in a direction along the path 310 from nozzle/outlets 308 toward a print medium (not shown), such as a paper or an image drum, which can be spaced from nozzle/outlets 308. Nozzle/outlets 308 can be formed in the aperture plate 312 contained on body 302 on the outlet side of the ink jet printhead 300. The disclosed coaxially electrospun layer 120 of FIGS. 1-2 can be disposed along the aperture plate 312.

In FIG. 4, the exemplary ink jet printhead 400 can have a body 402 which includes one or more ink pressure chambers 404 coupled to or in communication with one or more ink sources 406. A typical ink jet printer can include a plurality of ink pressure chambers 404 with each pressure chamber 404 coupled to one or more ink ejection means, for example, nozzle/outlets 408. For simplification, a single outlet 408 is illustrated in FIG. 4. Each nozzle/outlet 408 can be coupled to or in communication with an ink pressure chamber 404 by way of an ink passage indicated by arrows 410. Ink can pass through nozzle/outlet 408 during ink drop formation. Ink drops can travel in a direction along path 410 from nozzle outlets 408 toward a print medium (not shown) which can be spaced from nozzle/outlets 408. Nozzle/outlets 408 can be formed in an orifice plate or a printhead front face plate 412 contained on the body 402 on the outlet side of the ink jet printhead 400. The coaxially electrospun layer 120 of FIGS. 1-2 can be disposed along the orifice plate 412.

In FIG. 5, the exemplary printhead 500 can include a base substrate 502 with transducers 504 on one surface and acoustic lenses 506 on an opposite surface. Spaced from the base substrate 502 can be a liquid level control plate 508. A coaxially electrospun layer 120 in accordance with various embodiments can be disposed along the plate 508. The base substrate 502 and the liquid level control plate 508 can define a channel which holds a flowing liquid 512. The liquid level control plate 508 can contain an array 514 of apertures 516. The transducers 504, acoustic lenses 506, and apertures 516 can be all axially aligned such that an acoustic wave produced by a single transducer 504 can be focused by its aligned acoustics 506 at approximately a free surface 518 of the liquid 512 in its aligned aperture 516. When sufficient power is obtained, a droplet can be emitted from surface 518.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising."

Further, in the discussion and claims herein, the term "about" indicates that the value listed may be somewhat altered, as long as the alteration does not result in nonconformance of the process or structure to the illustrated embodiment. Finally, "exemplary" indicates the description is used as an example, rather than implying that it is an ideal.

Other embodiments of the present teachings will be apparent to those skilled in the art from consideration of the specification and practice of the present teachings disclosed herein. It is intended that the specification and examples be considered as exemplary only, with a true scope and spirit of the present teachings being indicated by the following claims.

What is claimed is:

1. A method for making an ink jet printhead nozzle plate comprising:
   providing a plate substrate; and
   coaxially electrospinning a core polymer and a shell polymer to form a coaxially electrospun layer on the plate substrate, wherein the coaxially electrospun layer provides a low adhesion, oleophobic textile surface exhibiting a low sliding angle with at least one of the jetted drops of ultra-violet gel ink and jetted drops of solid ink, and wherein the low sliding angle is from less than about 1° to less than about 30°, and wherein the shell polymer comprises a material including at least one selected from the group consisting of:
   a) a polymer or an oligomer containing an isocyanate functional group, wherein the isocyanate functional group is selected from the group consisting of diphenylmethane diisocyanate, toluene diisocyanate, hexamethylene diisocyanate, isophorone diisocyanate, a polymer or oligomer containing isocyanate (—NCO) functional groups, and a mixture thereof;
   b) a polymer or oligomer comprising an isocyanate functional group;
   a polymer or oligomer comprising a hydroxyl functional group; and
   a hydroxyl functionalized polymer or oligomer comprising at least one polysiloxine unit;
   c) a polymer or oligomer comprising an isocyanate functional group;
   a polymer or oligomer comprising a hydroxyl functional group; and
   a hydroxyl functionalized fluoro-crosslinking material;
   d) a polymer or oligomer comprising an isocyanate functional group;
   a polymer or oligomer comprising a hydroxyl functional group;
   a hydroxyl functionalized polymer or oligomer comprising at least one polysiloxane unit; and
   a hydroxyl functionalized fluoro-crosslinking material; and
   e) an isocyanate;
   a polylol;
   a hydroxyl functionalized polysiloxane; and
   a hydroxyl functionalized fluoro-crosslinking material.

2. The method of claim 1, wherein the low adhesion, oleophobic textile surface exhibits the low sliding angle from about 1° to less than about 15° with the jetted drops of ultra-violet gel ink or the jetted drops of solid ink.

3. The method of claim 1, wherein the coaxially electrospun layer is formed to have an ultimate tensile strength ranging from about 0.1 MPa to about 10 MPa.

4. The method of claim 1 further comprising forming a coaxially electrospun fiber having a core-shell structure, wherein the shell polymer is conformally coated on a fiber core during electrospinning.

5. The method of claim 4, wherein the coaxially electrospun fiber is formed to have an outer diameter ranging from about 100 nm to about 4 µm; wherein the conformally coated shell polymer has a shell thickness ranging from about 10 nm to about 0.5 µm.

6. The method of claim 4, wherein the coaxially electrospun layer is formed to comprise a fiber-on-fiber structure or a bead-on-fiber structure in order to provide the low adhesion, oleophobic textile surface.

7. The method of claim 6, wherein the bead-on-fiber structure of the coaxially electrospun layer comprises one or more beads formed on a surface of the coaxially electrospun fiber or at least partially embedded in the coaxially electrospun fiber.

8. The method of claim 7, wherein the one or more beads have an average size ranging from about 100 nm to about 5 μm and have a core-shell structure.

9. The method of claim 1, wherein the coaxially electrospun layer has an average pore size ranging from about 50 nm to about 50 μm; and has a porosity ranging from about 10% to about 99%.

10. The method of claim 1, wherein the core polymer is selected from the group consisting of Nylon, polycaprolactone (PCL), polystyrene, polymethyl-methacrylate (PMMA), poly(vinyl alcohol), poly(ethylene oxide), polyacrylonitrile, polylactide, poly(ether imide), polyurethane, poly(ether urethane), poly(ester urethane), aliphatic polyamide, aromatic polyamide, poly(p-phenylene terephthalate), poly(vinyl acetate), poly(acrylic acid), polyacrylamide, polyvinylpyrrolidone, poly(vinyl butyral), poly(alkly acrylate), poly(alkyl methacrylate), polycarbonate, polyhydroxybutyrate, polyimide, poly(vinylidene fluoride), poly(vinylidene fluoride-co-hexafluoropropylene), fluorinated ethylene-propylene copolymer, poly(tetrafluoroethylene-co-perfluoropropyl vinyl ether), perfluoroalkoxy, poly((perfluoroalkyl) ethyl methacrylate) and a mixture thereof.

11. The method of claim 1, wherein the shell polymer comprises a polymer or an oligomer containing an isocyanate functional group, wherein the isocyanate functional group is selected from the group consisting of diphenylmethane diisocyanate, toluene diisocyanate, hexamethylene diisocyanate, isophorone diisocyanate, a polymer or oligomer containing isocyanate (—NCO) functional groups, and a mixture thereof.

12. The method of claim 1, wherein the shell polymer comprises:
   a polymer or oligomer comprising an isocyanate functional group;
   a polymer or oligomer comprising a hydroxyl functional group; and
   a hydroxyl functionalized polymer or oligomer comprising at least one polysiloxane unit.

13. The method of claim 1, wherein the shell polymer comprises:
   a polymer or oligomer comprising an isocyanate functional group;
   a polymer or oligomer comprising a hydroxyl functional group; and
   a hydroxyl functionalized fluoro-crosslinking material.

14. The method of claim 1, wherein the shell polymer comprises:
   a polymer or oligomer comprising an isocyanate functional group;
   a polymer or oligomer comprising a hydroxyl functional group;
   a hydroxyl functionalized polymer or oligomer comprising at least one polysiloxane unit; and
   a hydroxyl functionalized fluoro-crosslinking material.

15. The method of claim 1, wherein the shell polymer comprises:
   an isocyanate;
   a polylol;
   a hydroxyl functionalized polysiloxane; and
   a hydroxyl functionalized fluoro-crosslinking material.

16. The method of claim 1, wherein the plate substrate is selected from the group consisting of steel, polyimide, silicon, nickel, copper, aluminum and a mixture thereof.

* * * * *